United States Patent [19]

Fauvarque

[11] Patent Number: 5,569,559
[45] Date of Patent: Oct. 29, 1996

[54] ALKALINE SOLID POLYMER ELECTROLYTE, ELECTRODE AND ELECTROCHEMICAL GENERATOR CONTAINING SUCH AS ELECTROLYTE

[75] Inventor: Jean-Francois Fauvarque, Paris, France

[73] Assignee: Conservatoire National des Arts et Metiers and Electricite de France (Service National), Paris, France

[21] Appl. No.: 392,900

[22] PCT Filed: Sep. 2, 1993

[86] PCT No.: PCT/FR93/00838

§ 371 Date: Mar. 1, 1995

§ 102(e) Date: Mar. 1, 1995

[87] PCT Pub. No.: WO94/06166

PCT Pub. Date: Mar. 17, 1994

[30] Foreign Application Priority Data

Sep. 2, 1992 [FR] France ................... 92 10471

[51] Int. Cl.⁶ ............. H01M 10/26; H01M 10/28
[52] U.S. Cl. ............. 429/192; 429/189; 429/191; 429/198; 429/206; 252/62.2
[58] Field of Search .............. 429/189, 191, 429/192, 206, 198; 252/62.2

[56] References Cited

U.S. PATENT DOCUMENTS

| | | | |
|---|---|---|---|
| 3,969,147 | 7/1976 | Croissant et al. | 429/206 |
| 4,024,213 | 5/1977 | Honda et al. | 264/154 |
| 4,699,857 | 10/1987 | Giovannoni et al. | 429/206 |
| 4,778,737 | 10/1988 | Sehm | 252/62.2 |
| 5,030,527 | 7/1991 | Carpio et al. | 429/192 |
| 5,424,150 | 6/1995 | Ohnishi et al. | 429/192 |

FOREIGN PATENT DOCUMENTS 0437309  7/1991  European Pat. Off. .

OTHER PUBLICATIONS

Mark and Kroshwitz, eds. *Encyclopedia of Polymer Science and Engineering*, vol. 6, John Wiley and Sons, 1986 (no month) p. 246.

Aldrich Chemicals Catalogue, 1994, (no month) p. 1188.

Database WPIL AN=81–52429, 30 May 1981.

*Primary Examiner*—Prince Willis, Jr.
*Assistant Examiner*—Carol Chaney
*Attorney, Agent, or Firm*—Watson Cole Stevens Davis, P.L.L.C.

[57] ABSTRACT

Aqueous alkaline solid electrolyte comprising a polar polymer matrix which is solid at ambient temperature, and a compound or mixture of basic compounds selected from alkaline metal, alkaline-earth or ammonium hydroxides. Preferably, the matrix is a polyether homopolymer or copolymer of different ethers or polyethers. The invention also concerns electrodes and/or electrochemical generators containing such an alkaline polymer solid electrolyte.

24 Claims, 4 Drawing Sheets

ALKALINE SOLID POLYMER ELECTROLYTE, ELECTRODE AND ELECTROCHEMICAL GENERATOR CONTAINING SUCH AS ELECTROLYTE

The present invention relates to an alkaline polymer solid electrolyte, to the electrodes containing such an electrolyte and to their applications, especially electrochemical generators.

The term alkaline polymer solid electrolyte denotes a material which possesses characteristics inherent in materials based on organic polymers and characteristics of conduction of an electric current by displacement of ions, in particular hydroxyl ions OH.

Such a material may be used for the production of electrochemical devices: electrodes, sensors, electrochromic devices, generators, etc.

The present invention relates more particularly to so-called rechargeable or secondary generators and is of particular interest in the case of generators containing a so-called soluble negative electrode, especially one of zinc.

It is known that commercial accumulators operate with a liquid electrolyte: either an aqueous acid solution, of which the most widespread are lead accumulators, or an aqueous alkaline solution, of which the most widespread are those with a cadmium or zinc negative electrode, or a solution of an organic or inorganic salt in an organic solvent, of which the most widespread are those with a lithium negative electrode.

The electrolyte is maintained in a quantity which is sufficient for ion exchange between the electrodes, by capillarity in porous separators. These separators are in different forms, such as fibers in woven or feltlike form consisting of various materials, such as glass, cellulosic polymers, vinyl polymers, polyolefins or polyamides, for example.

Nevertheless, not all of these separators are always satisfactory, owing to their permeable character:

either to zincate ions which are formed in discharge, leading to the formation of well-known dendrites on recharge, or to the oxygen which comes from the positive electrode in recharge, which prevents the complete charge of the negative electrode, especially when it is made of cadmium.

In order to remedy these drawbacks it has been proposed to replace these porous separators by sheets of polymers such as carboxymethylcellulose, carboxyl cellulose, regenerated cellulose and polyvinyl alcohol, although this measure does not give complete satisfaction.

These drawbacks are particularly notable in the case of nickel-zinc accumulators. In effect, this type of accumulator exhibits a serious defect in cyclability in aqueous potassium hydroxide because of the fact that potassium zincate, which is soluble, stratifies during discharge, and the zinc is deposited in the course of recharge at locations other than that where it dissolves. The result is a modification of the form and behavior of the zinc electrode. Moreover, during recharge, zinc dendrites form, which lead rapidly to short-circuits and render the accumulator unusable. Although specific membranes and various devices have been proposed for rendering the zinc electrode cyclable, it is found that these solutions do not give complete satisfaction, with the result that few nickel-zinc accumulators are on the market.

These parasitic phenomena are evidently not possible with solid polymer electrolytes (SPEs). These solid polymer electrolytes, moreover, are known to allow the production of thin generators which are easy to prepare by techniques involving the use of a polymer film.

By means of solid polymer electrolytes in salt or acid form it is hoped to obtain lithium accumulators of high performance in terms of capacity and cycling, or efficient fuel cells. These generators generally function at above ambient temperature (from 60° to 200° C.) since the conductivity of these SPEs is often poor at 25° C. and below. Moreover, lithium accumulators exhibit additional transfer resistances, principally at the positive electrode, which limits still further the power at ambient temperature and below.

Furthermore, in general, it is known that in aqueous media alkaline electrolytes exhibit a number of advantages with respect to acidic electrolytes ($H_2SO_4$) or saline electrolytes; in particular, a low variation in the composition of the electrolyte during cycling, and good conductivity at $-40°$ C., allowing power and capacity to be combined.

Thus one of the subjects of the present invention is to provide an alkaline polymer solid electrolyte which enables the disadvantages discussed above to be overcome.

Another object of the present invention is to provide an alkaline polymer solid electrolyte which has excellent ionic conductivity and other qualities which make it possible to obtain very thin films, especially of a few hundredths of a millimeter, which are sufficiently rigid to be self-supporting while retaining their property as an electronically resistant ionic conductor.

Another object of the present invention is to provide electrochemical generators which are provided with such electrolytes.

According to the present invention, the optionally aqueous, alkaline polymer solid electrolyte comprises a polar organic polymer matrix which is solid at ambient temperature, and a compound or a mixture of basic compounds chosen from alkali metal hydroxides or alkaline earth metal hydroxides or ammonium hydroxides.

The number-average molecular mass of the polymer used must be sufficient for the material to possess at ordinary temperature the mechanical behavior of a solid. It is not advantageous for it to be too high, to allow the constituents to be mixed readily in the melted state. Moreover, this electrolyte will advantageously be viscoelastic at ambient temperature so as to avoid parasitic electrical connections between the two terminals. These polymers advantageously have a molecular mass of between 2000 and 5 000 000.

These polymers must be polar and insensitive to hydrolysis. Among these polymers, it has been found that it is advantageous to use homopolymers of the polyether type or copolymers of various polyethers or ethers, such as those obtained by opening of oxirane, tetrahydrofuran and/or dioxolane rings.

Mixtures of polyethers may of course also be used. Polymers containing polyether blocks may also be used.

Among polyethers, use is advantageously made of polyethylene oxide (PEO) having a molecular mass of between 2000 and 5 000 000, preferably between 20 000 and 200 000. A commercially available polymer possesses a melting point situated at around 60° C.

The material which is produced in accordance with the invention contains one or more basic hydroxides which are soluble in the polar organic polymer at a temperature greater than the melting temperature of the material. These basic hydroxides are soluble ionic species which dissociate in the medium to form $OH^-$ ions. They comprise in particular alkali metal hydroxides chosen from sodium hydroxide (NaOH) and potassium hydroxide (KOH) in particular, ammonium hydroxides and alkaline earth metal hydroxides chosen, in particular, from barium dihydroxide ($Ba(OH)_2$) or calcium dihydroxide ($Ca(OH)_2$). Use will advantageously be made of potassium hydroxide, KOH, in its commercial pellet form, which dissolves very readily in the melted polyoxyethylene, an unexpected property which has not been indicated in the scientific and technical literature. Certain basic hydroxides such as lithium hydroxide, LiOH, do not themselves constitute good basic hydroxides for forming a material which is a good ionic conductor, since they are of inadequate solubility, but they may be used as additives with a view to specific applications. The same applies to numerous metal hydroxides which are capable of forming, in the presence of excess $OH^-$ ions, specific "ate complexes", for example aluminum hydroxide $Al(OH)_3$, zinc hydroxide $Zn(OH)_2$, etc.

Among quaternary ammonium hydroxides which are suitable within the scope of the present invention, it is possible to mention those which correspond to the formula $R_4N^+OH^-$ in which the radical R is a hydrocarbon radical. This hydrocarbon radical may be substituted in a known manner. N-Tetrabutylammonium hydroxide or tetraethylammonium hydroxide or tetramethylammonium hydroxide may be mentioned in particular.

The compound or mixture of basic compounds is preferably in the form of a solidified solution. This is to say that the mixture—polymer, compound and, if appropriate, water, is in the form of a solution at high temperature, for example 60° to 150° C., and in solid form at ambient temperature.

The solid polymer electrolyte generally contains water. Although the quantity of water may in theory be zero, it is generally at least equal to the quantity of residual water present in the commercially available forms of the basic hydroxides which are used, for example pellets of potassium hydroxide or sodium hydroxide. An additional quantity of water may advantageously be added to the medium.

The addition of water generally has the effect of lowering the viscosity of the melted medium and of accelerating the dissolution of the basic hydroxide. However, it is advantageous for the quantity of water added not to be too high, so that the material obtained when the composition is cooled to ordinary temperature should effectively be a solid. The water thus added is used principally, at ordinary temperature, for the solvation of the ions, especially the $OH^-$ anions, and it apparently makes them more mobile.

The material according to the invention may, if desired, contain additives such as plasticizers, modifying their mechanical properties (increased flexibility), inert inorganic fillers, dyes, or products of the electrochemical reactions of devices using this material according to the invention. The content of water is normally between 0.1 and 50% by weight. However, in accordance with the nature and molecular mass of the polymer, in particular a polyether, and the nature of the base, demixing may occur if the content of water is too high. For this reason, and also so that the electrolyte obtained at ambient temperature is a solid, it will be advantageous not to exceed a weight-percentage water content of greater than 30%. In general, the conductivity of the SPE increases with the water content.

According to a preferred embodiment the electrolyte comprises, in percent by weight:
  polymer: 30 to 90%, preferably 50 to 80%,
  basic compound: 5 to 50%, preferably 10 to 30%
  water: 0 to 30%, preferably 5 to 25%.

It has surprisingly been found that the solidified solution of basic compound in the polyether leads to a mixture of the rigid viscoelastic type which retains its shape without flowing when it is left on its own. This is particularly the case when potassium hydroxide and a polyethylene oxide are used. This property is particularly advantageous for producing electrochemical generators such as will be described below, in particular in the form of thin films.

According to a typical and unexpected characteristic of the invention the electrolyte, which is a viscous liquid above its melting temperature, forms at ordinary temperature (25° C.) a perfectly solid material by at least partial crystallization either of the polymer used or of an ionic species which comprises the polymer in its crystalline structure.

However, a solid material obtained with an amorphous polymer is not excluded from the scope of the invention, inasmuch as the material may be considered as water and basic hydroxide dissolved in the polymer and not as a solution of polymer and basic hydroxide in water.

The scope of the invention excludes, in particular, gelatinous materials which are obtained by dissolving in water a basic hydroxide and are gelled by dissolving a small quantity of appropriate, optionally crosslinkable organic polymers (such as, for example, those described in EP-A-4 37309), or by formation of an inorganic gel of a metal hydroxide of low solubility (alumina, silica, etc.). Such materials, which are known and have been used for a very long time as electrolyte in commercial alkaline cells, cannot be considered as being solid polymer electrolytes.

The material according to the present invention may be stored indefinitely in its initial form in the solid state, at ordinary temperature; it may be made liquid or pasty above its melting temperature and may be shaped by conventional techniques for shaping melted, crystallizable polymers: extrusion, molding, etc., and may be solidified in the desired shape by cooling.

After solidification, the shape of the material may be modified further by heating, melting of the material, appropriate mechanical action and resolidification by cooling.

This operation may be repeated as many times as is desired.

In accordance with the conventional properties of polymer materials, the material according to the invention has a glass transition temperature Tg which depends on its composition and is preferably chosen to be lower than the normal temperature at which the material is used, and has a melting temperature Tm which is in the region of the melting temperature of the basic constituent polymer.

DESCRIPTION OF PREFERRED EMBODIMENTS

Figure 1:
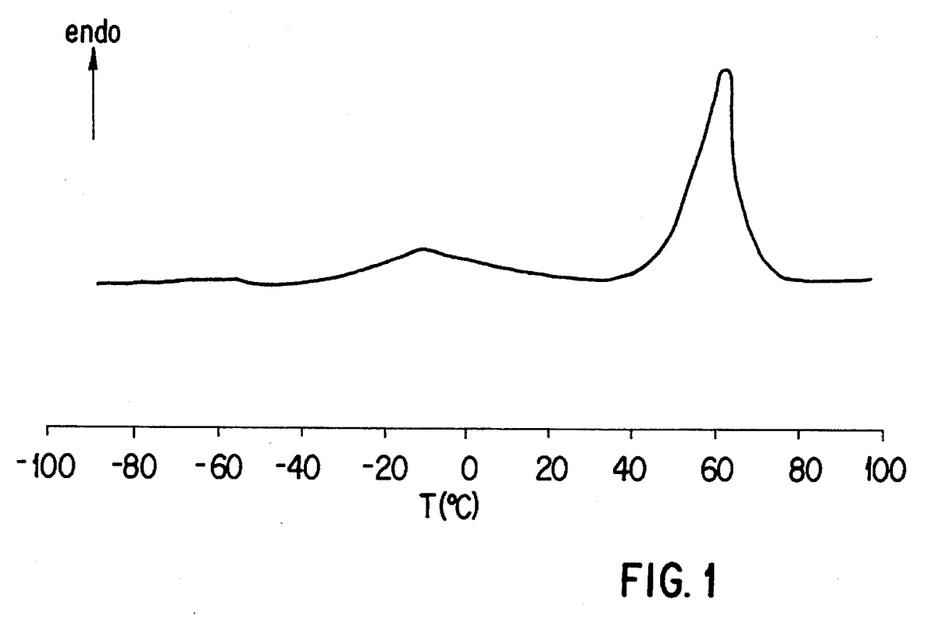
FIG. 1 shows a thermogram obtained by DSC of a typical material in accordance with the invention.

FIG. 1 shows a thermogram obtained by DSC (Differential Scanning Calorimetry) of a typical material in accordance with the invention, with a heating rate of 10°/min. The following are observed for the chosen composition:

PEO, Mn 20 000, 64%
KOH, 16%
H$_2$O 20%
Tg=about −10° C.
Tm=about −60° C.
Tm being in the region of the melting temperature of the PEO
Tg being the glass transition temperature of the material.

Like all partially crystalline polymeric materials, the material according to the invention may also be subjected to irreversible but limited plastic deformations at temperatures greater than its glass transition temperature Tg and less than its melting temperature Tm. Like any solid material, the material according to the invention may also undergo elastic deformations within the limit of its elasticity range.

It has been found unexpectedly and very surprisingly that the material according to the invention possesses a very high ionic conductivity at ordinary temperature, generally much greater than $10^{-3}$ S.m$^{-1}$ and often greater than $10^{-1}$ S.m$^{-1}$. These values are surprising because the best anhydrous solid polymer electrolytes, obtained by dissolving a lithium salt, LiClO$_4$, for example in PEO, have conductivities which are at best equal to $10^{-3}$ S.m$^{-1}$ at 25° C. (ref.: N.B. ARMAND—Current State of PEO-Based Electrolyte in Polymer Electrolyte Reviews, Volume 1. J. R. MacCallum and C. A. Vincent, Elsevier Applied Science—London 1987).

The ionic conductivity is preferably between 0.01 and 1 S.m$^{-1}$, preferably between 0.01 and 0.3 S.m$^{-1}$ at 25° C.

Figure 2:
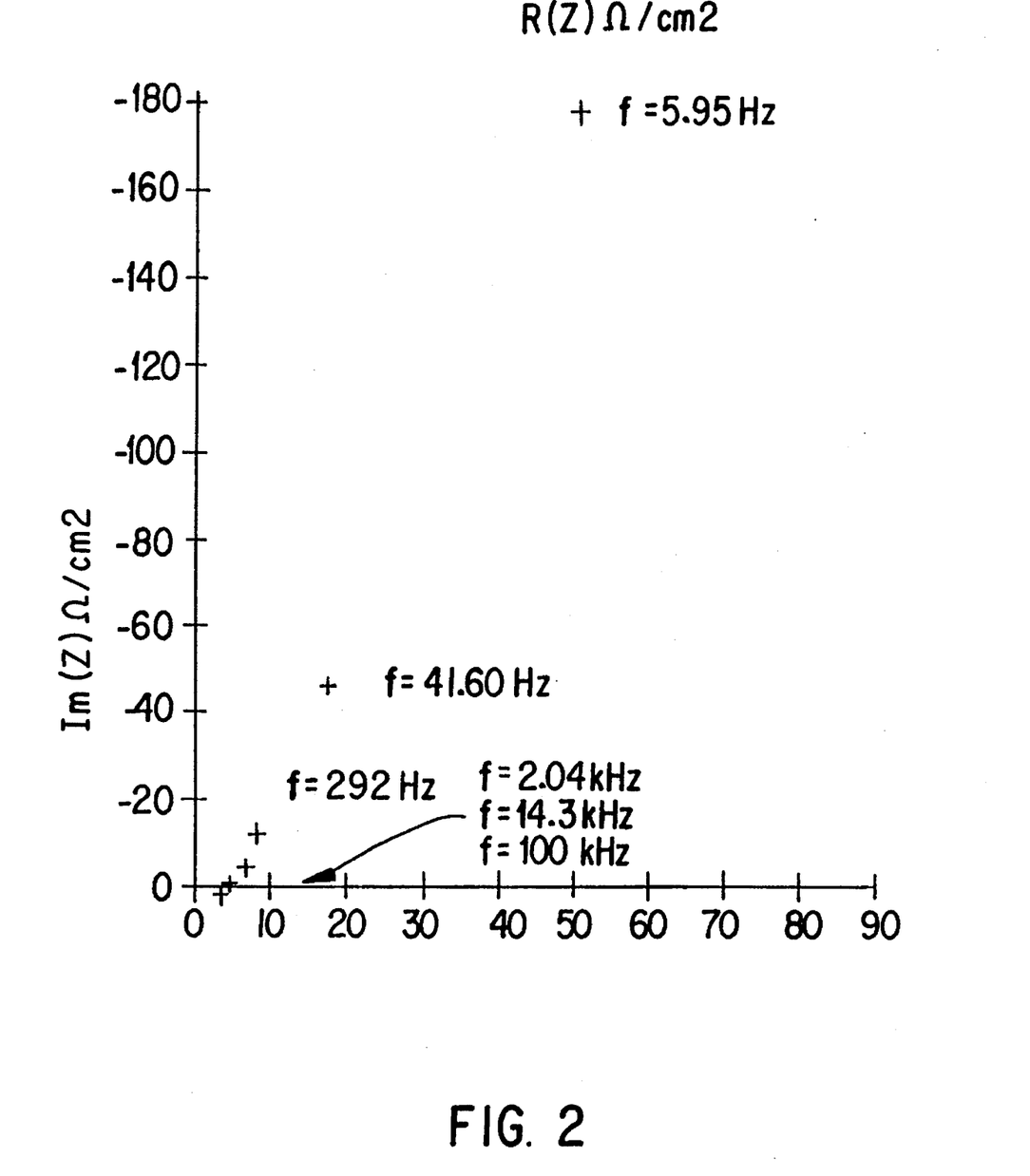
FIG. 2 is an impedance diagram of a conductivity cell using a material according to the invention as an electrolyte.

FIG. 2 represents the impedance diagram at 25° C. of a conductivity cell using a material according to the invention as electrolyte, the composition of the material being: PEO 64%, KOH 20%, H2O 16%.

Figure 3:
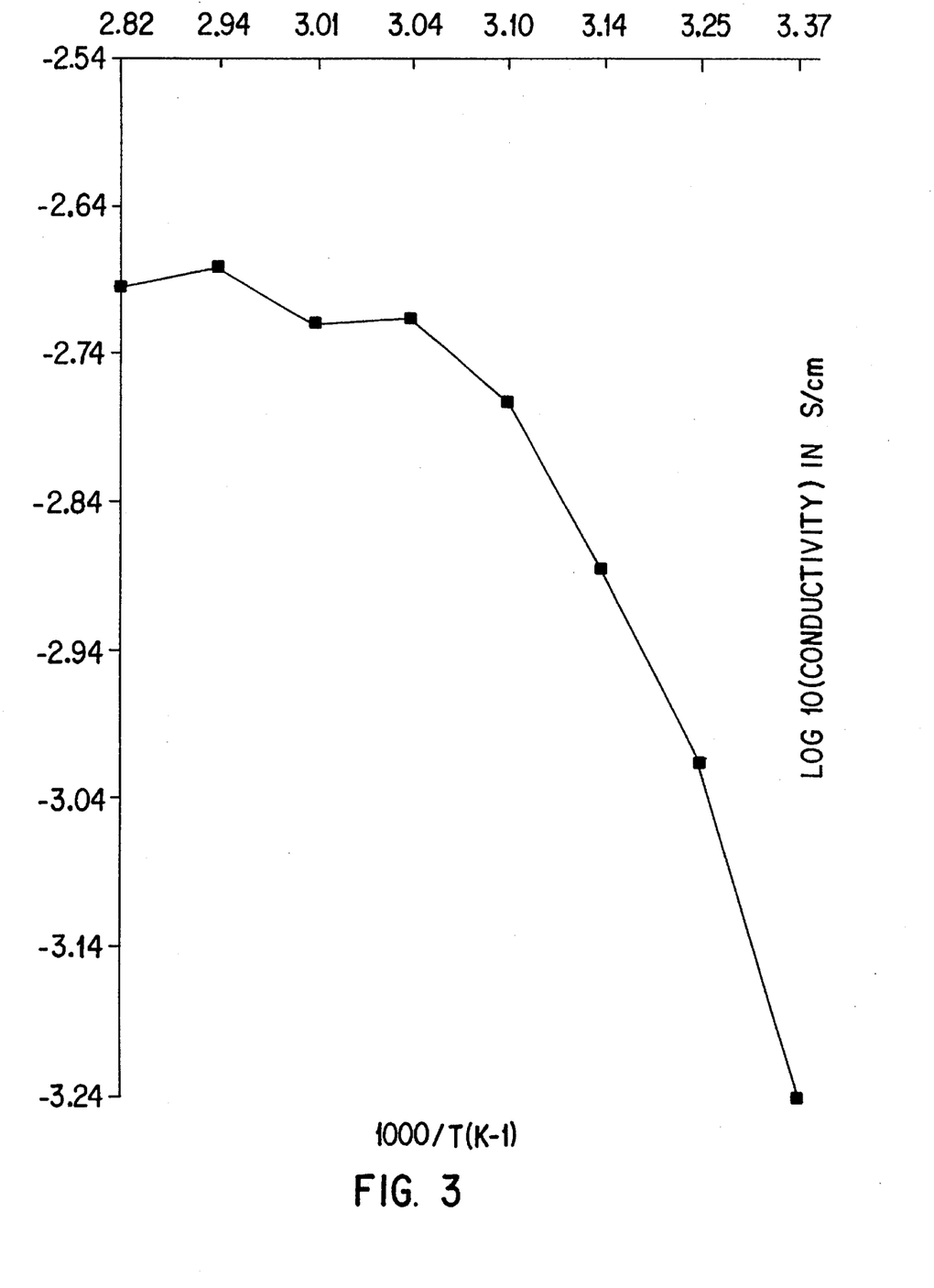
FIG. 3 shows variations in the conductivity of a material of the invention as a function of temperature.

FIG. 3 shows the variations in conductivity of this material as a function of temperature: log (conductivity)=f (1000/T). This variation is typical of those observed with solid polymer electrolytes.

The invention also relates to an alkaline polymer solid electrolyte such as may be obtained by dissolution of the basic hydroxide described above in the polymer in the melted state at an appropriate temperature, in particular according to the compositions indicated above in general or in particular.

This temperature will advantageously be between 60° and 150° C., depending on the nature of the polymer and its molecular mass.

In the case of a polyether of the polyethylene oxide type it has been found surprisingly that a solid polymer electrolyte, which is a good ionic conductor, may be prepared by dissolution at around 70°–110° C. of a basic hydroxide as described above, especially potassium hydroxide, in a melted polymer, especially polyethylene oxide.

The present invention also relates to a process for the preparation of an alkaline polymer solid electrolyte as described above, characterized in that one or more polar polymers are mixed at a temperature in which it [sic] is in the melted state, preferably between 60° and 150° C., with one or more basic compounds, optionally in the presence of water and appropriate additives, and in that the mixture is cooled and the said electrolyte is recovered.

According to a particular embodiment, in an inert atmosphere, the basic hydroxide(s) chosen, the quantity of water desired and, optionally, the desired additives are added to the melted polymer. The mixture is then poured into molds and cooled or converted to granules and stored in this form. The material is subsequently processed by appropriate processes, which most often comprise molding of the melted material, but may also be converted and processed by conventional polymer processing techniques, including dissolution in an appropriate volatile solvent (ethanol, for example) followed by evaporation of the solvent.

The invention also relates to electrodes comprising one or more electrochemically active materials connected by an electrolyte according to the invention. It is thus possible to produce positive or negative active masses of an electrochemical generator.

The active materials of the negative electrode or of the positive electrode may be connected mechanically by this polymer electrolyte. This electrolyte provides, in particular, the ionic conductivity of the porous electrode.

The active materials are those which are well known for constituting the negative electrode and the positive electrode of an electrochemical generator, such as those which are described below.

The electrodes preferably comprise, in percent by weight:
active material: 20 to 80%, preferably 40 to 75%,
electrolyte: 80 to 20%, preferably 60 to 25%.

The present invention also relates to the production of electrochemical device [sic] employing alkaline SPE as electronically insulating, ion-conducting separator which, however, connects, in the adhesive sense of the term, the active faces of the positive and negative electrodes.

The production of the electrochemical devices in accordance with the invention may be facilitated by raising, if possible, the device to a temperature greater than the melting point of the alkaline SPE, in order to obtain good electrical contact between the electrodes and the alkaline SPE, then allowing the device to cool slowly with compression, while taking care, however, to avoid the formation of short-circuits between the two electrodes, by means of wedges of appropriate thickness.

The invention also relates to an electrochemical generator equipped with a negative electrode and a positive electrode which are, if desired, formed from an active material connected to the electrolyte as described above and which are connected by an electrolyte according to the present invention, which occupies the interelectrode space.

The present invention relates in particular to the electrochemical devices which are known by the name of rechargeable electrochemical generators, storage batteries or fuel cells.

Such a generator comprises a negative electrode and a positive electrode which are formed, if desired, as described beforehand by an active material connected by the alkaline SPE and by a separator comprising the alkaline SPE according to the invention.

This generator is of course connected, at least during operation, to collectors which serve as an outlet for the electric current.

The electrochemical generators to which the present invention especially relates are those comprising a negative electrode of the zinc, cadmium, iron, aluminum, magnesium or metal oxide or hydride type, or a gas electrode such as the hydrogen electrode, and a positive electrode of the nickel, molybdenum, chromium, vanadium, manganese, mercury, silver or copper oxide or hydroxide type; sulfides of iron, titanium or molybdenum, or a gas electrode of the air or oxygen type.

The electrodes may also be formed from a mixture of these materials.

The rigid viscoelastic character of the electrolyte according to the invention allows the elimination of the serious problem of leaks which are often encountered in the course of using electrochemical generators such as cells. This character also makes it possible to maintain the cohesion, in the first place, of the active materials of the electrodes while assuring the ionic conductivity of the porous electrode, and in the second place of the separator, especially when it is in the form of a thin layer, without the device of an inert texture, while ensuring ionic conduction and electronic insulation, and thirdly of the active layers on either side of those of the separators.

These electrolytes according to the invention, in addition, exhibit the advantage of having a very low permeability to gases such as oxygen.

Moreover, as has already been indicated beforehand, another advantage resulting from the physicochemical characteristics of the electrolyte according to the invention is that it is possible to obtain very thin films, especially those of a few hundredths of a millimeter, and that these films are self-supporting while retaining their property of electronically resistant ionic conduction. These thin films are particularly suited to so-called thin generators.

The invention also relates to thin generators containing an electrolyte according to the invention.

The present invention also relates to an electrochemical generator consisting of layers of active material (constituting the negative electrode and the positive electrode) which are connected by the electrolyte according to the invention so as to constitute a thin film, in particular a few hundredths of a millimeter thick, which is adherent and is in electronic connection with a conductive support such as a metal strip, for example.

The invention relates more particularly to a bi-electrode consisting of a metal strip in combination on each face with two opposed active materials connected by an electrolyte according to the present invention.

It is thus possible to form very thin bielectrodes, leading to high power densities and energy densities without the risk of spontaneous discharge owing to leakage currents.

In a general manner, another advantage of the present invention is that it enables the lifetime of secondary generators to be prolonged in the course of charge/discharge cycles. This property is particularly advantageous in the case of generators with a zinc negative electrode.

The invention therefore relates also to an electrochemical generator with a zinc negative electrode and comprising an electrolyte according to the present invention.

Relative to the prior art it is found that the cycling lifetime is increased by close to five times, and that it is consequently possible to reach several hundred cycles, a remarkable value for a generator with zinc electrodes.

Moreover, it has very surprisingly been found that nickel hydroxide can be oxidized reversibly in contact with the electrolyte according to the invention. In effect, contrary to expectations, nickel oxyhydroxide NiOOH is known in basic medium to oxidize —$CH_2OH$ groups, the groups which constitute the ends of the polyether chains. Effectively under hot conditions (T 80° C.), in the melted state, the mixture as described in the preparation process—namely the polyether, the basic compound and water—reduces a charged nickel electrode more quickly than the latter spontaneously discharges at this temperature. At ordinary temperature, the nickel electrode recharges very readily.

The invention also relates to a nickel-zinc accumulator whose positive electrode consists of nickel hydroxide immersed in an electrolyte according to the invention, which is shaped into a leaf and is optionally connected to a collector which serves to lead off the current, with a negative electrode consisting of zinc metal powder or zinc oxide and immersed in the electrolyte according to the invention, the two electrodes being connected by an electrolyte according to the invention. Cadmium powder or copper amalgam is preferably added in order to increase the conductivity of the negative electrode described above.

In order to increase the conductivity of the positive electrode, finely divided nickel powder is advantageously added.

The invention also relates to a fuel cell in which the electrolyte is in accordance with the invention.

Figure 6:
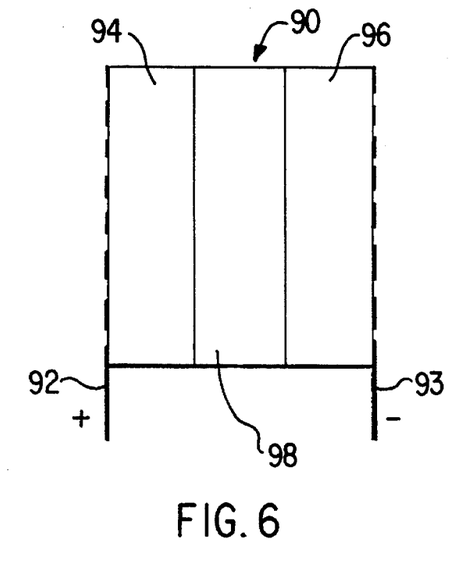
FIG. 6 shows a simplified schematic drawing of a fuel cell.

According to a particular variant, the cell is of the $O_2$-air-$H_2$; or the $O_2$ (air) —$NH_3$ type. FIG. 6 shows a simplified schematic drawing of a fuel cell 90. The fuel cell 90 has collectors 92, 93, an air electrode 94, a hydrogen electrode 96 and alkaline polymer solid electrolyte 98 therebetween.

Other cells may also be produced.

Thus it is possible to use aluminum in an Al-air or Al-nickel electrode cell, and Al—$MnO_2$, although aluminum is attacked under hot conditions with the formation of hydrogen. It is even possible to produce Zn-air and Zn—$MnO_2$ generators. In the case of a positive electrode based on $MnO_2$, the electrode is partially rechargeable if the electrode is not highly discharged.

Still more preferably, the electrolyte according to the invention is in the form of a film impregnating a conventional nonwoven separator made of glass fiber, cellulosic polymer, vinyl polymer, polyolefin or polyamide, for example.

In general, generators with a planar structure, in particular a parallelepipedal structure, are encapsulated in a polymer casing which is intended simply to protect them from the atmosphere, with two exits for current, one positive and the other negative, to enable these generators to be charged and discharged.

The examples below illustrate the invention and are given only by way of indication.

EXAMPLE 1

Figure 4:
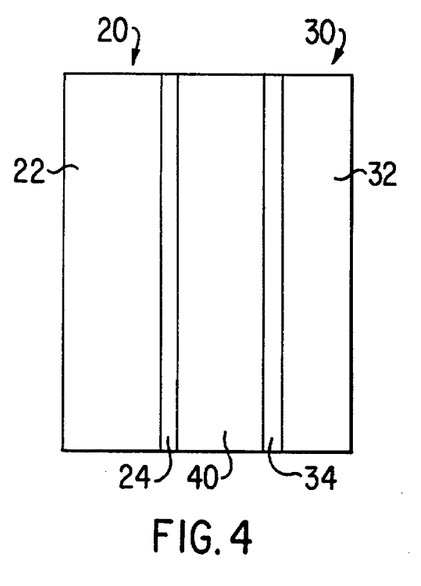
FIG. 4 shows a schematic representation of a nickel-zinc accumulator of Example 1.

A nickel-zinc accumulator is produced by the following process:

As schematically shown by FIG. 4, the positive electrode 20 consists of a nickel frit 22 charged with nickel hydroxide by the method known per se, the negative electrode 30 is made of expanded zinc 32, mesh 1n1-12, or preferably cadmium-coated, expanded copper coated with electrode-posited zinc or impregnated with zinc oxide.

The electrolyte consists of 63 g of polyethylene oxide or PEO, 27 g of KOH pellets containing 14% water, and 10 g of water in total (including that in the KOH pellets).

The PEO is heated to melting at 100° C., the KOH pellets are then dissolved with stirring, and then the remaining water is introduced with stirring and avoiding evaporation.

The fluid mixture is subsequently sprayed over each of the electrodes, negative 30 and positive 20 (shown in FIG. 4), in a thin layer 24, 34, and then, before the electrolyte hardens, the two electrodes are assembled face to face with the interposition of a nonwoven polymer separator and are pressed in order to remove excess electrolyte and to ensure good contact.

A zinc metal negative electrode is combined with a positive electrode which has been formed beforehand in an aqueous solution of KOH. In contrast, a discharged positive electrode is combined with a zinc oxide negative electrode.

EXAMPLE 2

A nickel-zinc accumulator is produced by the following process:

The positive electrode is formed by intimately mixing, at 100° C., 60 g of nickel hydroxide and 40 g of electrolyte formed from a mixture of 25 g of polyethylene oxide homopolymer having an average molecular mass of between 10 000 and 50 000 and 15 g of potassium hydroxide containing 5 g of water.

The mixture is then rapidly shaped into a leaf 50 (schematically shown by FIG. 5), still at 100° C., while inserting a collector 52 which serves to lead off current, with the aid, for example, of an extrusion scraper or any other means known per se.

The negative electrode 60 (shown by FIG. 5) is formed by a method similar to that for the positive electrode, by intimately mixing, at 100° C., 70 g of zinc metal powder or zinc oxide and 30 g of the same PEO/KOH complex, and is then shaped with insertion of a collector 62.

Figure 5:
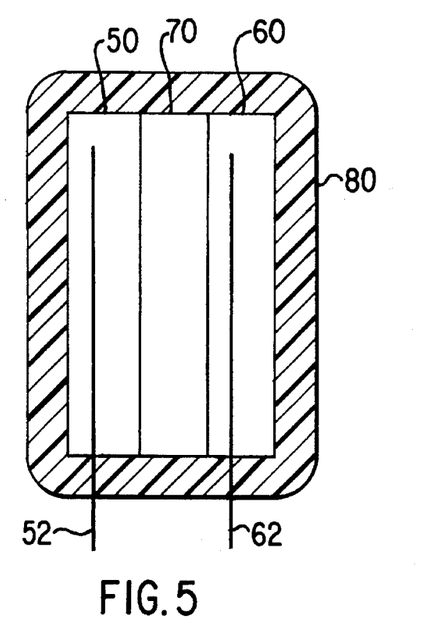
FIG. 5 shows a schematic representation of a nickel-zinc accumulator of Example 2.

The two electrodes are assembled and joined by a film of the same KOH/PEO electrolyte impregnating a conventional nonwoven separator 70.

This generator with a parallelepipedal planar structure is encapsulated in a polymer casing 80 which is intended simply to protect it from the atmosphere, two current exits, one positive, the other negative, which enable this generator of parallelepipedal shape to be charged and discharged.

EXAMPLE 3

An accumulator is produced as in Example 2 but with the following variation: 10 g of cadmium powder are added to the mixture for forming the negative electrode in order to improve the conductivity of this negative electrode.

EXAMPLE 4

An accumulator is produced as in Example 3 but with the following variation: 5 g of fine copper powder are added to the mixture for forming the negative electrode in order to improve the conductivity of this negative electrode.

EXAMPLE 5

An accumulator is produced as in Example 2 but with the following variation: 15 g of finely divided nickel powder are added to the mixture for forming the positive electrode in order to improve the conductivity of the positive electrode.

EXAMPLE 6

A nickel-zinc accumulator is produced by stacking leaves obtained according to Example 2 in the form of a strip which is subsequently rolled on itself in order to form the cylinder to be inserted in the metal sleeve, in accordance with the well-known technique for Ni/Cd accumulators, the metal sleeve and the end-cap crimped over a plastic joint serving, respectively, to lead off the current for the positive and negative electrodes.

EXAMPLE 7

A "bielectrode" accumulator is produced by covering a very thin metal strip of 1 to 5/100 mm with cadmium or cadmium-coated copper or copper amalgam for the face which is intended to be covered by a negative layer, and with nickel or stainless steel for the face which is intended to be covered by the positive layer, respectively, with a layer which forms the negative electrode as described in Example 2, with a thickness of 95 micrometers, and with a layer forming the positive electrode as described in Example 2, with a thickness of 97 micrometers.

Owing to the viscoelastic nature of the binder, there are no parasitic electrical connections established between these two faces. Because of this, it is easy to establish efficient serial or parallel connection from the point of view of the power or energy densities.

EXAMPLE 8

A power electrode is produced consisting of a zinc or aluminum metal leaf for the negative electrode. This electrode is covered with a so-called active, finely divided metal deposit, such as zinc or cadmium. This electrode replaces the negative electrode of the devices described in Examples 2 to 4.

EXAMPLES 9 TO 11

Other accumulators are produced using the electrolyte described in Example 2.

The positive electrode is produced by mixing 50 g of electrolyte with 50 g of manganese or copper or silver oxide. The negative electrode consists of leaves or frits of zinc or cadmium or manganese.

Other accumulators which function in an aqueous medium, such as the nickel-metal hydride accumulator and nickel-gaseous hydrogen accumulator, are produced with the electrolyte described in Example 2.

An accumulator is produced which uses an iron sulfide or alkali metal polysulfide cathode connected by the above-mentioned electrolyte, which accumulator is combined by means of the same electrolyte with the zinc electrode assembly which is connected by the same electrolyte coated with a separating film of the same mixture.

The example which follows describes an $O_2$ (air) —$H_2$ or $O_2$ (air) —$NH_3$ fuel cell which is produced using an alkaline electrolyte obtained in accordance with Example 2 in order to separate the electrodes.

EXAMPLE 12

A fuel cell is produced using, as electrolyte, a mixture of 70 g of polyethylene oxide and 30 g of N-tetrabutylammonium hydroxide in the form of a 40% by weight solution of N-tetrabutylammonium hydroxide.

I claim:

1. An aqueous alkaline polymer solid electrolyte consisting essentially of a mixture of a polar organic polymer matrix which is solid at ambient temperature, and a compound or a mixture of basic compounds chosen from alkali metal hydroxides or alkaline earth metal hydroxides or ammonium hydroxides, and water, the content of water being between 0.1 and 30% by weight, wherein the electrolyte is in the form of a liquid at a temperature in the range from 60° to 150° C., and is in the form of a solidified solution at ambient temperature.

2. The electrolyte according to claim 1, wherein its ionic conductivity is between 0.01 and 1 S/m at 25° C.

3. The electrolyte according to claim 1, wherein the matrix is a polyether homopolymer or a copolymer of different ethers or polyethers.

4. The electrolyte according to claim 3, wherein the matrix is a polyethylene oxide with a molecular mass of between 2000 and 5,000,000.

5. The electrolyte according to claim 4, wherein the alkali metal hydroxides are chosen from sodium hydroxide (NaOH), potassium hydroxide (KOH), lithium hydroxide (LiOH) and the alkaline earth metal hydroxides.

6. The electrolyte according to claim 3, wherein the matrix is a polyethylene oxide with a molecular mass between 20,000 and 200,000.

7. The electrolyte according to claim 1, wherein:
the polymer is 30 to 90% by weight of the electrolyte; and
the basic compound is 5 to 50% by weight of the electrolyte.

8. The electrolyte according to claim 1, consisting essentially of in percent by weight:
the polymer: 50 to 80%;
the basic compound: 10 to 30%; and
water: 5 to 25%.

9. A process for the preparation of an alkaline solid polymer electrolyte according to claim 1, comprising mixing one or more polar polymers at a temperature in which the one or more polar polymers are in the melted state with one or more of the basic compounds, optionally in the presence of water, to form a mixture, cooling the mixture and recovering the electrolyte.

10. The process of claim 9, wherein the alkaline solid polymer electrolyte has a solid polar organic polymer matrix at ambient temperature consisting essentially of, melting the polymer matrix and dissolving a hydroxide selected from the group consisting of an alkali metal hydroxide, an alkaline earth metal hydroxide and ammonium in the melted matrix at a temperature of from 60° to 150° C. in the presence of 0.1 to 30 weight percent water.

11. The process of claim 9, wherein said polymer matrix is polyethylene oxide and said temperature is between 70° to 110° C.

12. The process according to claim 9 for the preparation of the alkaline solid polymer electrolyte consisting essentially of the mixing, cooling and recovering steps.

13. An electrode comprising one or more active materials connected to an electrolyte according to claim 1.

14. An electrode according to claim 13, comprising, in percent by weight:
the active material: from 40 to 75%
the electrolyte: from 60 to 25%.

15. An electrochemical generator provided with a negative and a positive electrode, comprising one or more active materials connected to an electrolyte of claim 1, which are connected to a portion of the electrolyte of claim 1 which occupies an interelectrode space.

16. The electrochemical generator according to claim 15, wherein the negative electrode comprises a member selected from the group consisting of zinc, cadmium, iron, aluminum, magnesium, or metal oxide or hydrides thereof, or is a gas electrode such as a hydrogen electrode; the positive electrode comprises a member selected from the group consisting of nickel, molybdenum, chromium, vanadium, manganese, mercury, silver or copper oxide or hydroxide; sulfides or iron, titanium or molybdenum, or is a gas electrode comprising air or oxygen.

17. The electrochemical generator according to claim 16 wherein the negative electrode comprises zinc.

18. The electrochemical generator according to claim 17, wherein the positive electrode consists essentially of nickel hydroxide immersed in the electrolyte, which is shaped into a leaf and is optionally connected to a collector for leading off current, and the negative electrode consists essentially of zinc metal powder or zinc oxide immersed in the electrolyte, the two electrodes being connected by the electrolyte.

19. The electrochemical generator according to claim 15, consisting essentially of a conductive support and layers of active materials constituting the negative electrode and the positive electrode, which are connected by the electrolyte so as to constitute a thin adherent film, and in electronic connection with the conductive support.

20. The electrochemical generator according to claim 19, wherein the conductive support comprises a metal strip.

21. A bi-electrode consisting essentially of a conductive support in combination on each face with two opposed active materials connected by an electrolyte according to claim 1.

22. A fuel cell, comprising an electrolyte, wherein the electrolyte is an electrolyte according to claim 1.

23. The electrolyte according to claim 1, wherein its ionic conductivity is from 0.01 and 0.3 S/m at 25° C.

24. The electrolyte according to claim 1, wherein the electrolyte consists of the polymer matrix, the compound or mixture of compounds, and water.

* * * * *